US008326795B2

(12) United States Patent
Markovic

(10) Patent No.: US 8,326,795 B2
(45) Date of Patent: Dec. 4, 2012

(54) ENHANCED PROCESS QUERY FRAMEWORK

(75) Inventor: Ivan Markovic, Karlsruhe (DE)

(73) Assignee: SAP AG, Walldorf (DE)

( * ) Notice: Subject to any disclaimer, the term of this patent is extended or adjusted under 35 U.S.C. 154(b) by 257 days.

(21) Appl. No.: 12/037,258

(22) Filed: Feb. 26, 2008

(65) Prior Publication Data

US 2009/0216731 A1   Aug. 27, 2009

(51) Int. Cl.
*G06F 7/00* (2006.01)
*G06F 17/00* (2006.01)
*G06F 17/30* (2006.01)

(52) U.S. Cl. ......... 707/600; 707/777; 717/104; 705/348
(58) Field of Classification Search .................. None
See application file for complete search history.

(56) References Cited

U.S. PATENT DOCUMENTS

| | | | | |
|---|---|---|---|---|
| 5,963,739 | A * | 10/1999 | Homeier | 717/126 |
| 7,201,580 | B2 * | 4/2007 | Ho et al. | 434/219 |
| 7,240,028 | B1 * | 7/2007 | Rugge | 705/30 |
| 7,302,383 | B2 * | 11/2007 | Valles | 704/9 |
| 7,328,216 | B2 * | 2/2008 | Hofmann et al. | 1/1 |
| 7,676,539 | B2 * | 3/2010 | Jhoney et al. | 709/202 |
| 7,707,131 | B2 * | 4/2010 | Chickering et al. | 706/45 |
| 2008/0016020 | A1 * | 1/2008 | Estes | 706/52 |
| 2008/0040510 | A1 * | 2/2008 | Warner et al. | 709/246 |
| 2009/0307032 | A1 * | 12/2009 | Tribe et al. | 705/7 |
| 2010/0223223 | A1 * | 9/2010 | Sandler et al. | 706/50 |

OTHER PUBLICATIONS

"A Critical Overview of Web Services Choreography Description Language", Published by Alistair et al., 2005.*
Markovic et al., "Towards a Formal Framework for Reuse in Business Process Modeling," in *Business Process Management Workshops* (Berlin / Heidelberg, Springer, 2008), 4928 (2008): 484-495.
'Advances in Semantics for Web Services 2007 Workshop; $2^{nd}$ Edition' [online]. Semantics4ws'07, 2007, [retrieved on Apr. 17, 2009]. Retrieved from the Internet: <URL: http://events.deri.at/semantics4ws2007/>, 6 pages.
Beeri et al., "Querying business processes," *Proceedings of the 32nd international conference on Very large data bases*, Seoul, Korea, 2006, pp. 343-354.
European Office Action for Application No. 09 001 690.8, dated Jan. 27, 2012, 8 pages.
Ivan Markovic et al: "Querying in Business Process Modeling," Sep. 17, 2007, Service-Oriented Computing—ICSOC, 2007 Workshops, Springer Berlin Heidelberg, Berlin, Heidelberg, pp. 234-245.

* cited by examiner

*Primary Examiner* — Susan Chen
(74) *Attorney, Agent, or Firm* — Fish & Richardson P.C.

(57) ABSTRACT

An enhanced process query framework, including receiving a user input defining behavioral and static aspects of a target process artifact, and automatically defining a query specification including an axiom component expressing the static aspect using a logical expression, and a process definition component expressing the behavioral aspect using ontologized π-calculus. The process further includes querying a process artifact library using the automatically defined query specification, and outputting a candidate process artifact matching the defined behavioral and static aspects, based on querying the process artifact library.

20 Claims, 11 Drawing Sheets

ENHANCED PROCESS QUERY FRAMEWORK

FIELD

The present disclosure generally relates to process modeling.

BACKGROUND

In the modern world, businesses constantly strive to reinvent and differentiate themselves under continuous pressures of regulatory and technological change. As priorities and perspective change, business may suffer from a lack of support when incorporating new business requirements into existing information systems.

SUMMARY

In order to respond quickly to changing market requirements, a business organization may need to increase the level of agility in various phases of the business process engineering chain. For example, business process (BP) modeling may be the first and most important phase in this chain. Designing a new (and redesigning an existing) process model may be a highly complex, time-consuming and error-prone task.

According to one general implementation, a contribution to BP modeling is provided that may occur by designing and implementing a framework for querying business process artifacts in a business process modeling phase. For example, the framework may support decision making, facilitate the reuse of modeling artifacts, and help to ensure compliance of models to relevant regulations.

According to one general implementation, a computer-implemented process includes receiving a user input defining behavioral and static aspects of a target process artifact, and automatically defining a query specification including an axiom component expressing the static aspect using a logical expression, and a process definition component expressing the behavioral aspect using ontologized $\pi$-calculus. The process further includes querying a process artifact library using the automatically defined query specification, and outputting a candidate process artifact matching the defined behavioral and static aspects, based on querying the process artifact library.

Implementations may include one or more of the following features. For example, the dynamic aspect may define constraints on desired control and data flow for the target process artifact. The static aspect may define a business function, or a business role, resource, and goal objective for the target process artifact. Outputting the candidate process may further include substituting the candidate process artifact for, or appending the candidate process artifact to, an existing process artifact in a process.

In additional examples, receiving the user input defining the static aspects of the target process artifact may further include displaying a user interface comprising a business annotation selection region displaying desired business annotations, and an ontology navigator region displaying available ontology concepts. Receiving the user input may also include receiving a user selection by dragging an available ontology concept from the ontology navigator region to the business annotation region, thereby rendering the dragged ontology concept as a selected desired business annotation, and outputting, as the user input, the selected desired business annotation.

Additionally, the process may also include receiving a user selection of a tab corresponding to a process model classification, and outputting, as the user input, the process model functional classification corresponding to the selected tab, the process model functional classification being one of a functional classification, a role classification, a resource classification, or a goal classification.

In further examples, outputting a candidate process artifact may further include outputting a process model, pattern, fragment, or guideline, determined based upon a user preference. Receiving the user input defining the behavioral aspect of the target process artifact may further include displaying a user interface comprising a business process display region displaying a business process, receiving a user selection highlighting a portion of the business process, and outputting, as the user input, an automatically generated behavioral description of the highlighted portion, described using ontologized $\pi$-calculus. The automatically generated behavioral description may exclude any portion of the business process not highlighted via the user selection. The axiom component may express the static aspect using Web Service Modeling Language (WSML) Logical Expression (LE).

In other examples, the process includes matching the candidate with the defined behavioral aspect using congruence and bisimulation. The query specification may further include a type indicator indicating whether the candidate process artifact is to be appended to or substituted for an existing process artifact. The query specification may further include a namespace. The process artifact library may be queried using the axiom component, and, after querying the process artifact library using the axiom component, the process artifact library may be queried using the process definition component. The process may also include automatically refining the query to add or eliminate constraints, and re-querying the process artifact using the automatically refined query, or reusing the output candidate process in a new business process The process may also include determining a business guideline associated with the output candidate process, and outputting the determined business guideline.

According to another general implementation, a device includes an interface module and a modeling tool module. The interface module is configured to receive a user input defining behavioral and static aspects of a target process artifact, and to output a candidate process artifact matching the defined behavioral and static aspects, based on querying a process artifact library. The modeling tool module is configured to automatically define a query specification including an axiom component expressing the static aspect using a logical expression and a process definition component expressing the behavioral aspect using ontologized $\pi$-calculus, and to query the process artifact library using the automatically defined query specification.

In a further example, the modeling tool module further includes a business modeling tool configured to provide an environment for modeling business processes, an ontology reasoner configured to perform ontological reasoning for querying the process artifact library, a behavioral reasoner configured to perform $\pi$-calculus reasoning, and an ontology application programming interface (API) configured to create and manipulate an ontology object model for the business modeling tool, where the process artifact library is configured to persistently store process patterns, models, fragments, and guidelines.

According to a further general implementation, a computer program product is tangibly embodied in a computer-readable medium. The computer program product includes instructions that, when read by a machine, operate to cause data processing apparatus to receive a user input defining behavioral and static aspects of a target process artifact, and to automatically define a query specification including an axiom component expressing the static aspect using a logical expression, and a process definition component expressing the behavioral aspect using ontologized π-calculus. The computer program product also includes instructions that operate to cause data processing apparatus to query a process artifact library using the automatically defined query specification, and to output a candidate process artifact matching the defined behavioral and static aspects, based on querying the process artifact library.

The details of one or more implementations are set forth in the accompanying drawings and the description, below. Other features and advantages of the disclosure will be apparent from the description and drawings, and from the claims.

BRIEF DESCRIPTION OF THE DRAWINGS

Like reference numbers represent corresponding parts throughout.

DETAILED DESCRIPTION

In order to respond quickly to changing market requirements, a business organization may need to increase the level of agility in all phases of the business process engineering chain. For example, business process (BP) modeling may be the first and most important phase in this chain. Designing a new (and redesigning an existing) process model may be a highly complex, time-consuming and error-prone task.

This disclosure describes a contribution to BP modeling that may occur by designing and implementing a framework for querying business process artifacts in a business process modeling phase. For example, the framework may support decision making, facilitate the reuse of modeling artifacts, and help to ensure compliance of models to relevant regulations.

BP models may be created by business analysts or other users with an objective to capture business requirements, enable a better understanding of business processes, facilitate communication between business analysts and Information Technology (IT) experts, identify process improvement options, and serve as a basis for the derivation of executable business processes. Designing a new process model may be a highly complex, time-consuming and error-prone task. This is because BP modeling may involve several sources of information, BP models are dynamic and may be frequently redesigned to adapt to changes, and BP models are often shared by several departments within a company or even between different companies.

Simplification of BP modeling may occur when models are highly reusable or when BP modeling favors process flexibility and minimizes designs made from scratch. Reusing models may imply, for example, the need for querying process repositories in order to find suitable previous work that may be the base for a new design or may be used to update an existing design. Such model reuse may be done, for example, using an expressive and machine-readable description of relevant aspects of a BP model that may help to retrieve the most relevant parts of a previous work (e.g., a BP model or portion thereof).

Therefore, in order to enable expressive querying of BP models, a modeling framework may use a comprehensive formal process model description that captures all relevant dimensions (perspectives) of a process. Functional, behavioral, organizational and informational perspectives may be considered relevant to adequately organize information about a process. The formal model for describing business processes which integrates all aforementioned perspectives will be described in more detail in reference to FIG. 7, infra.

Figure 1:
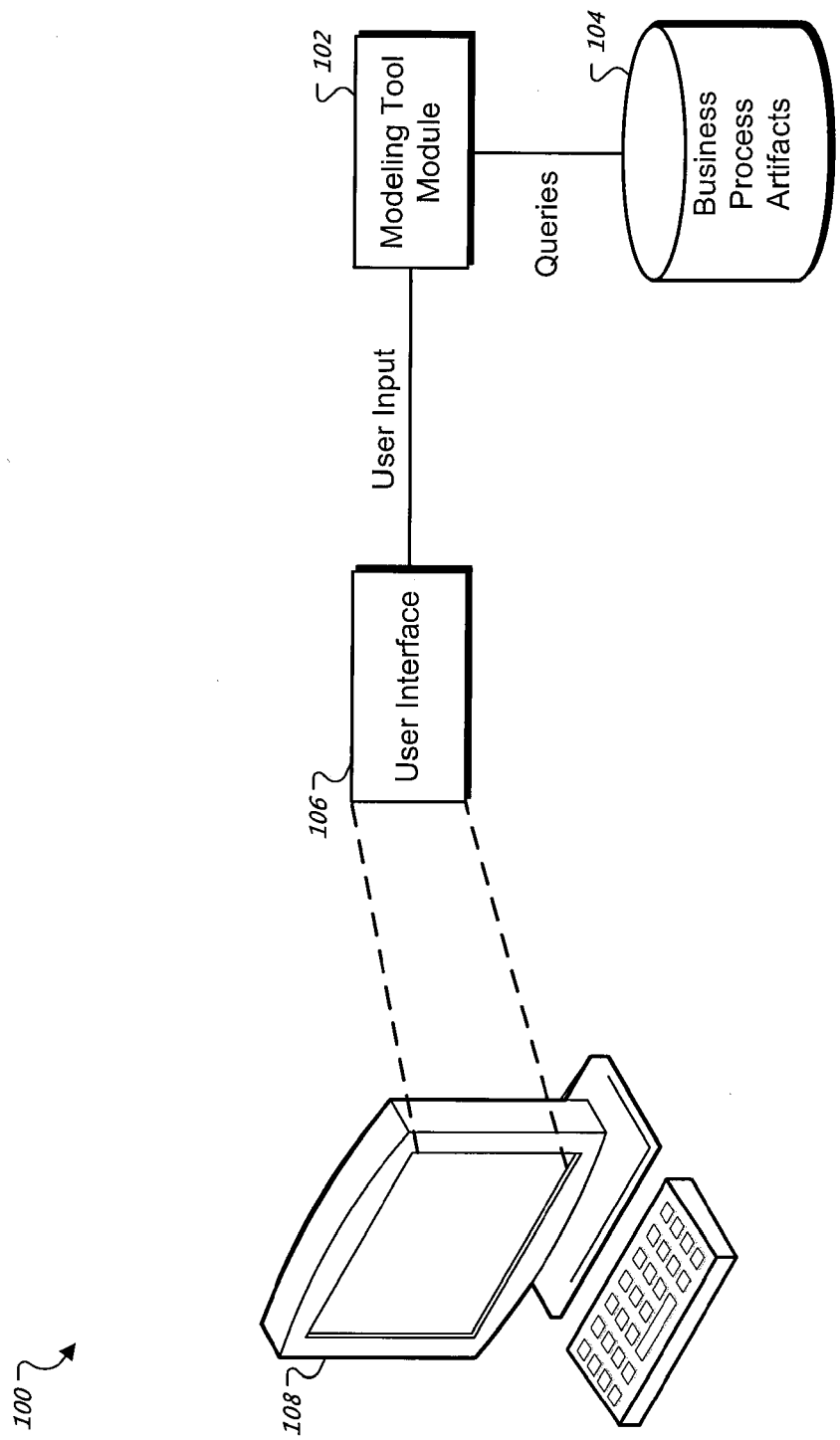
FIG. 1 is a block diagram of an exemplary system that implements an enhanced business process query framework.

FIG. 1 is a block diagram of an exemplary system 100 that implements an enhanced business process query framework. Briefly, the exemplary system 100 includes a modeling tool module 102, a repository of business process artifacts 104, a user interface 106, and a front-end system 108. The components 102-108 of the system 100 may be combined in a standalone computer system, or they may be connected by way of at least one network, e.g., a local area network (LAN) or any other network.

The modeling tool module 102 may be used to define behavioral and static aspects of business processes and to automatically define query specifications. Such a query specification (or query) may include multiple components, such as an axiom component and a process definition component. The axiom component, for example, may express the static aspect of a business process using a logical expression. The process definition component may express the behavioral aspect of a business process using, for example, ontologized π-calculus. The modeling tool module 102 may use the automatically defined query specification to query a process artifact library, such as the repository of business process artifacts 104. As a result of responding to the query, the system 100 may output a candidate process artifact matching the defined behavioral and static aspects, based on querying the process artifact library (e.g., the business process artifacts 104).

The modeling tool module 102 may provide an environment for modeling business processes. The module 102 may include: an ontology reasoner that may perform ontological reasoning for querying the process artifact library, a behavioral reasoner that may perform π-calculus reasoning, and an ontology application programming interface (API) configured to create and manipulate an ontology object model for the business modeling tool.

In one example, a business analyst or other user may use the system 100 to define business processes (e.g., as part of a use case or a larger business process). As such, the business analyst may employ the front-end system 108 to access business process information on the system 100. For example, the front-end system 108 may be a work computer or other client device (e.g., home computer, laptop, etc.) that includes business process modeling software/applications. The front-end system 108 may incorporate the user interface 106, which may include, for example, various screens and controls for defining (e.g., selecting, querying, modifying, etc.) business process models. Such screens and controls may be displayed, for example, on the screen of the front-end system 108.

Continuing with the example, the business analyst may employ controls of the user interface 106 to issue user inputs that are received by the modeling tool module 102. For example, the user inputs may include any user inputs, such as text entry (e.g., into text fields), selection(s) from lists, selections made in checkboxes, radio buttons or other controls, voice commands, etc. Any such user inputs are received by the modeling tool module 102 which may generate corresponding queries to access associated BP modeling information from the repository of business process artifacts 104. In some cases, the user inputs received by the modeling tool module 102 may include user inputs to store new (or update existing) BP modeling information.

The repository of business process artifacts 104 may be configured to persistently store process patterns, models, fragments, and guidelines. As such, the business process artifacts 104 may provide, when queried, modeling information to the modeling tool module 102. Such artifacts 104 may be used by the user of the front-end system 108 to create or update process models without having to do so from scratch.

Figure 2:
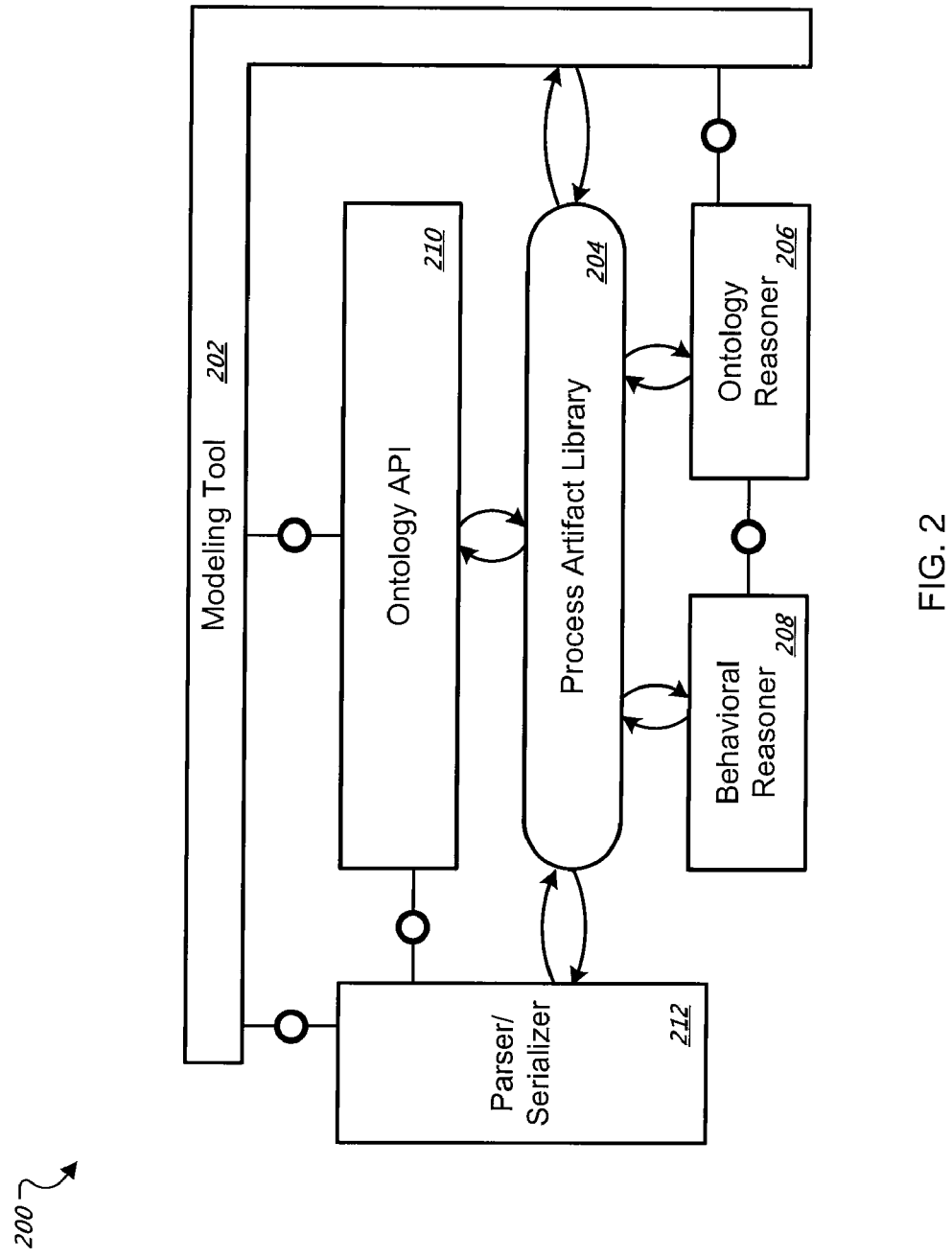
FIG. 2 is a block diagram of exemplary components of the querying framework of FIG. 1.

FIG. 2 is a block diagram of exemplary components of the querying framework 200 of system 100. Specifically, the components are depicted using Fundamental Modeling Concepts (FMC) notation, showing the relationships and communication among components. Briefly, the components include a business modeling tool 202, a process artifact library 204, an ontology reasoner 206, a behavioral reasoner 208, an ontology API 210, and a parser/serializer 212.

The business modeling tool 202 may provide an environment for modeling business processes. In particular, the business modeling tool 202 may be used by the user (e.g., business expert, business analyst, etc.) to interact with the framework. The user may interact through a user-friendly query interface, such as screens and controls that are part of business process modeling applications. In one example implementation, the business modeling tool 202 uses the SAP "Maestro for BPMN" modeling tool.

The process artifact library 204 may provide persistent storage for process patterns, models, fragments and guidelines. In some implementations, the process artifact library 204 may be implemented using the Ontology Representation and Data Integration (ORDI) framework, or any other middleware component designed to be able to load various ontology languages and to allow enterprise data integration via an RDF-like data model.

The ontology reasoner 206 may perform ontological reasoning for obtaining the query results. Because behavioral reasoning may be computationally more expensive, query answering by the ontology reasoner is performed first, which serves as a filtering step to obtain a subset of process descriptions for later behavioral conformance checking. Ontologies may be represented in the Web Service Modeling Language (WSML) Logical Expression (LE) language, and as such, some implementations may use the WSML2Reasoner framework on top of the KAON2 back-end reasoner to perform ontological reasoning. Other implementation may use any other modular architecture that combines various validation, normalization, and transformation algorithms for translating ontology descriptions in WSML into the appropriate syntax of underlying reasoning engines.

The behavioral reasoner 208 may perform $\pi$-calculus reasoning, serving as a query answering mechanism for graphical queries used in process substitution and auto-completion scenarios. The behavioral reasoner 208 may implement a strict congruence algorithm, based on the definition of bisimulation form. In some implementations, the Mobility Workbench (MWB) may be embedded as a subsystem in the framework, implementing bisimulation for the $\pi$-calculus.

The ontology API 210 may provide methods for creating and manipulating the ontology object model. For instance, the ontology API 210 may be used by the modeling tool 202 for creating an in-memory representation of the modeled process, based on the ontology framework described in reference to FIG. 7. In some implementations, the ontology API 210 may be implemented using WSMO4J, a reference implementation for WSMO and WSML specifications.

The parser/serializer 212 may provide the round trip transformation between any WSML ontological representation and the plain $\pi$-calculus representation describing the behavioral perspective of a process.

Figure 3:
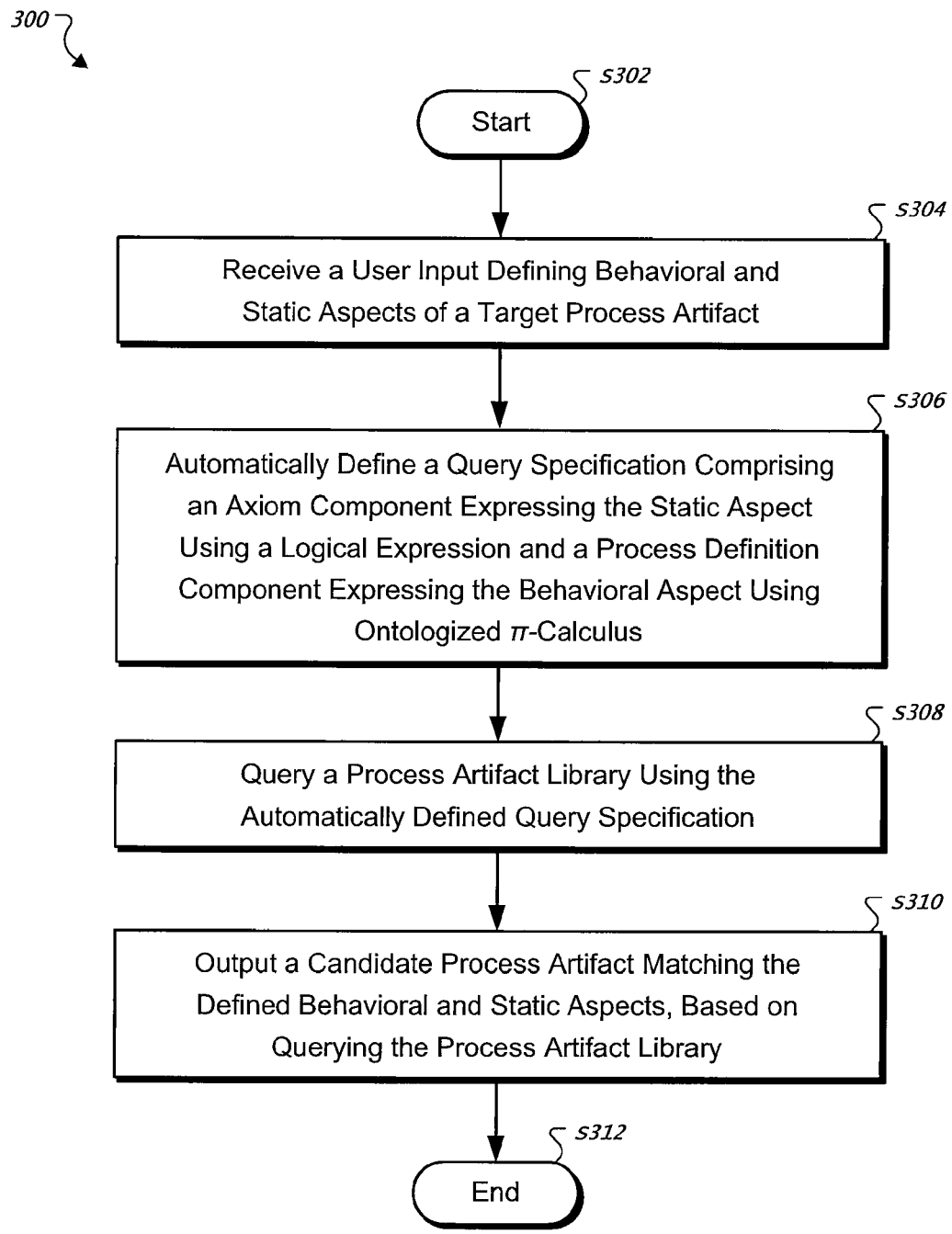
FIG. 3 is a flowchart illustrating an exemplary process for querying business process artifacts.

FIG. 3 is a flowchart illustrating an exemplary process 300 for querying business process artifacts. For example, the process 300 may be used for the querying process that operates inside the business process modeling framework 200 (refer to FIG. 2). Generally, the process 300 may include a formal query language which has been defined for coupling static and dynamic process characteristics. Further, the process 300 may include a mechanism for processing queries. In some implementations, the process 300 may include flexibility in querying for providing better query results, such as to increase or decrease the number of query results.

Briefly, the computer-implemented process 300 includes receiving a user input defining behavioral and static aspects of a target process artifact. The process 300 also includes automatically defining a query specification that includes at least two components: an axiom component expressing the static aspect using a logical expression, and a process definition component expressing the behavioral aspect using ontologized $\pi$-calculus. The process 300 further includes querying a process artifact library using the automatically defined query specification and outputting a candidate process artifact matching the defined behavioral and static aspects.

In more detail, when process 300 begins (S302), a business process (BP) modeling system is capable of receiving user inputs. For example, referring to FIG. 1, the modeling system may be a computer application (e.g., the modeling tool module 102) designed for modeling business process models, and the application may be running on a user's front-end system 108.

Returning to FIG. 3, user input defining behavioral and static aspects of a target process artifact is received (S304). For example, the user input may be a selection or other input handled by the user interface 106. Specifically, the user input may be related to querying business process artifacts for use in a specific business process model upon which the user is working.

A query specification is automatically defined that comprises an axiom component expressing the static aspect using a logical expression and a process definition component expressing the behavioral aspect using ontologized $\pi$-calculus (S306). For example, the modeling tool module 102 may receive the user input and generate the query specification based on the user input. Specifically, the user input may include multiple components, such as an axiom component and a process definition component. The query specification generated is in a format, for example, that the repository of business process artifacts 104 may understand.

The query may support the description of static and dynamic behavior. WSML Logical Expression (LE) may be used for specifying queries on static properties of a process. The syntax of WSML-LE may be based on Frame Logic or other suitable syntax. In some implementations, the query may reference instances of business annotations, which are materialized by instances of the business relations, such as:

bpo#hasBusinessFunction(?x,Annot1) and
bpo#hasBusinessRole(?x,Annot2) and
bpo#hasBusinessResource(?x,Annot3) and
bpo#hasBusinessGoal(?x,Annot4).

The dynamic behavior of a suitable process may be described as a process definition. As such, the process may use the ontology framework described below in reference to FIG. 7. Briefly, the ontology framework may describe a process, its connections, and the annotations of tasks as relation instances. Defining that the behavioral query has the same structure as the process definitions may avoid the mismatch problem that would appear from having a different query language for behavioral querying.

Therefore, the ontologized π-calculus may be used to describe the user request (process query). This query may be checked against processes stored in the repository using congruence and bisimulation properties.

The query specification may be defined to use the same language used by process descriptions. This enables the reuse of the ontological process model for representing the user queries. For meeting reusability requirements, the query specification may be in a format of a template with placeholders. In addition, the query specification may encapsulate both static and dynamic attributes in a unified language.

The use of a Business Process Ontology (BPO) ontology instance may provide the solution to this. Specifically, the query template may correspond to a pre-defined ontology structure with namespace definition and element descriptions. Table 1 shows an example of template contents:

TABLE 1

Example Template Contents

| Namespace | http://www.ip-super.org/ontologies/BPO/extension/query |
|---|---|
| dc:type | Either "substitution" or "autocompletion" |
| Axiom | ID: http://www.ip-super.org/ontologies/BPO/extension/query#static definedBy: bpo#hasBusinessResource(?x, __PLACEHOLDER__) 'OR' bpo#hasBusinessFunction(?x, __PLACEHOLDER__) 'OR' bpo#hasBusinessGoal(?x, __PLACEHOLDER__) 'OR' bpo#hasBusinessRole(?x, __PLACEHOLDER__) |
| Process | ID: http://www.ip-super.org/ontologies/BPO/extension/query#process A BPO process model description. |

Table 1

Example Template Contents

The ontology may contains an axiom (e.g., containing the static query), and a process definition (e.g., containing the process behavior). The non-functional property dc:type indicates the type of behavioral query being performed.

The ontology submitted as a query may contain all necessary information for specifying the query request. The approach may enable performing ontological reasoning on the static part and π-reasoning on the dynamic part of a process description. This approach also may be scalable, since adding new concepts or adding new information to the query will not imply changes to the established query definition.

In order to reduce the level of complexity, the task may be divided into two subtasks—static and dynamic (behavioral) querying. The querying mechanism operates on a Business Process Ontology (BPO), as will be described in more detail in reference to FIG. 7.

The first subtask may investigate simple (static) querying, where the user may specify constraints related to the static view of a process. Here, WSML logical expressions may be used as a query language and ontological reasoning for query answering. The second subtask may investigate graphical (behavioral) querying, where the user may specify requirements on dynamic perspectives of a process description.

This may correspond to auto-completion and substitution scenarios where algorithms from bisimulation theory may be used for comparing the processes (e.g., for equivalence).

Referring again to FIG. 3, a process artifact library is queried using the automatically defined query specification (S308). For example, referring to FIG. 1, a query that is representative of the user's input is issued by the modeling tool module 102 against the repository of BP artifacts 104. The query may contain, for example, an axiom component and a process definition component.

In response to the query, a candidate process artifact is output that matches the defined behavioral and static aspects, based on querying the process artifact library (S310). For example, the artifact may include textual process information related to the static aspects of a BP model, or the artifact may include graphical or other representation of information related to the behavioral aspects of the BP model. The process 300 ends (S312) when the framework has responded to the query.

The intended users of the framework may include, for example, business experts. To aid in understanding the information, the users may be provided with an intuitive and user-friendly query interface that allows the users to specify their queries in an easy way, such as in a way that is not much different from using the applications they are used to. The complexities of ontologies and reasoning may be hidden from the user. Business or modeling guidelines can be queried both for new processes (or fragments) which are imported in the tool during modeling (so that they are correctly applied), as well as existing process models. For example, a user may model a process and check to see if it is compliant with all appropriate guidelines.

Figure 4:
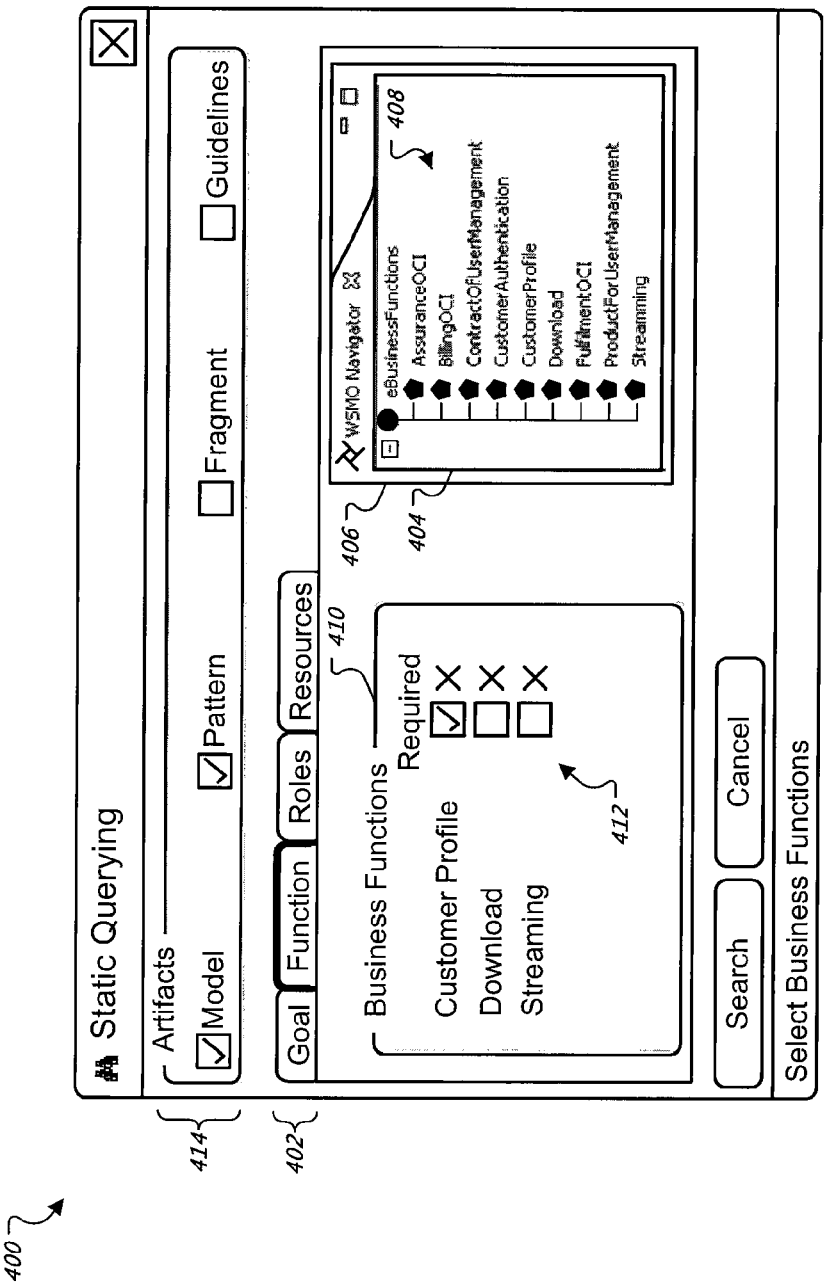
FIG. 4 shows an exemplary query input dialog for performing the queries on the static view of a process.

FIG. 4 shows an exemplary query input dialog 400 for performing the queries on the static view of a process (static queries). The user may navigate through multiple tabs 402 for selecting business annotations (e.g., business goals, functions, roles and resources) of the processes to be retrieved. For example, these characteristics may correspond to the perspectives depicted in FIG. 7.

In an ontologies box 404, an ontology navigator 406 may provide available ontology concepts 408 which the user may browse. Desired business annotations represented by the ontology concepts 408 may be dragged from the ontologies box 404 to a business functions panel 410 and marked 412 as required or optional for querying. This may be important for achieving flexibility in querying, since the concepts marked as optional may be omitted when constructing the query for retrieving more results. The user may also specify the type(s) of artifacts 414 to be queried (e.g., model, pattern, fragment, guideline, etc.). In some implementations, other controls may exist for controlling how queries are handled and how information is used (e.g., entered, defined, dragged, copied, etc.) on the screen.

In contrast to performing static queries, querying for desired behavior may not need a new dialog. For example, querying may be performed by selecting a process part (or fragment) directly in the modeling tool.

Figure 5:
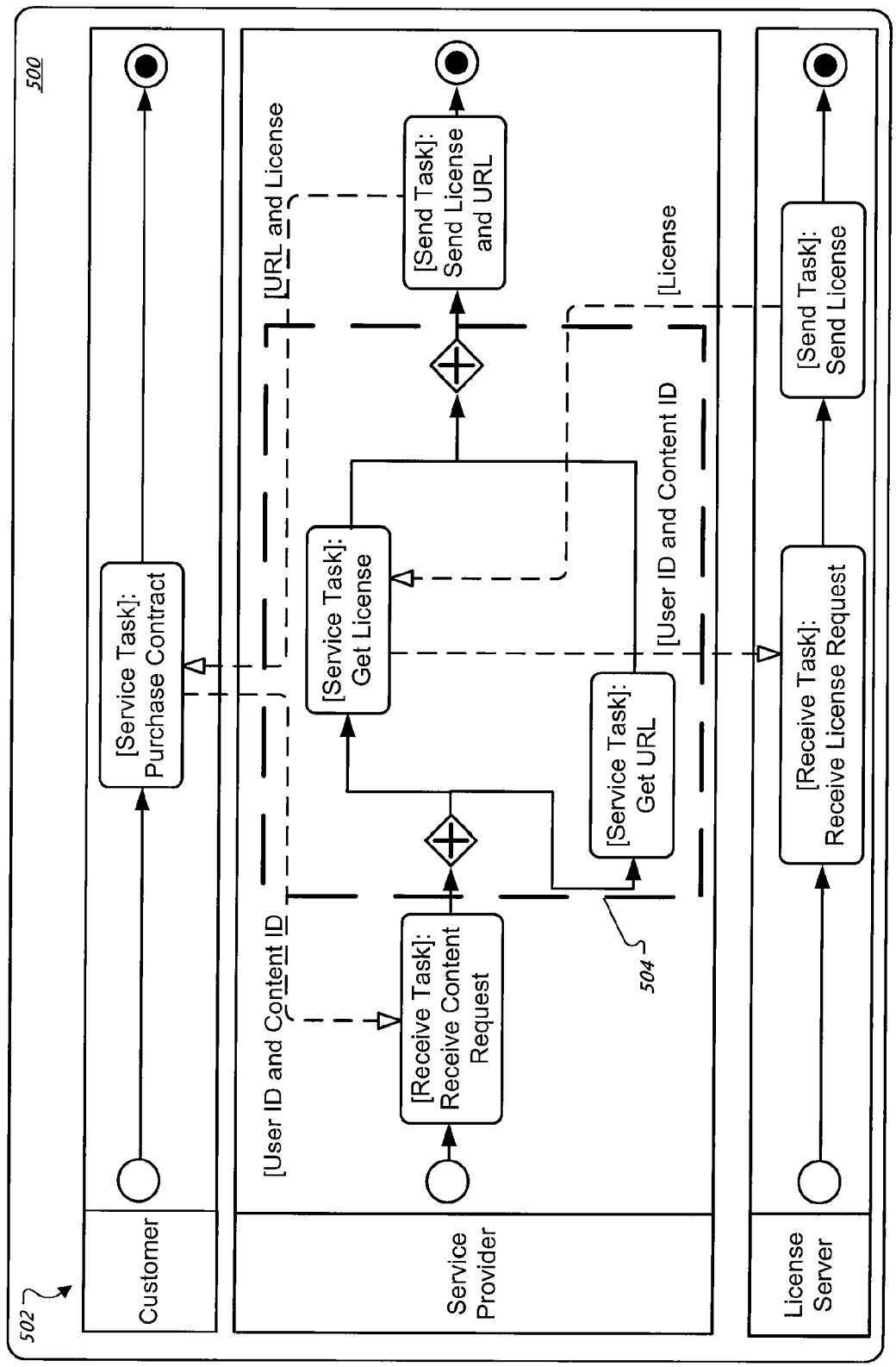
FIG. 5 shows an exemplary interface for selecting a fragment (or portion) of an overall business process model.

FIG. 5 shows an exemplary interface 500 for selecting a fragment (or portion) of an overall business process model 502. For example, a user may see the interface 500 on the screen of a modeling application, such as the modeling tool module 102 shown in FIG. 1. The interface 500 may be used to display and operate upon the dynamic aspects of a BP model, such as defining constraints on desired control and data flow for the target process artifact. The business process model 502 displayed in the interface 500 may be selected in various ways, such as from another screen (not shown) or generated using inputs from the user. With the entire business process model 502 displayed, the user may select a model fragment 504 (depicted here as a dashed line box) which graphically contains only a subset of the components of the overall business process model 502.

Selecting the model fragment 504 may be done in several ways. In some implementations, the user may use a mouse click to define a starting position (e.g., a starting corner of the dashed line box), then drag the mouse until a desired dashed box is displayed. In some implementations, the selection of the model fragment 504 may be made by clicking on components (e.g., boxes, arrows, etc.) of the overall business process model 502. In that case, the interface 500 may automatically draw the shaded box (or other such shape) around the fragment 504, or the interface 500 may shade or color components that are currently selected.

In some implementations, the user may use the interface 500 to append or replace process artifacts (or fragments thereof) to an existing process artifact for a process model. For example, while the user has fragment 504 identified (e.g., with a dashed box), the user may employ controls (not shown) available in the interface 500 to modify the fragment 504 or to substitute another fragment. To differentiate between an append or replace action, the query specification may include, for example, a type indicator indicating whether the candidate process artifact is to be appended to, or substituted for, an existing process artifact.

This approach of graphical querying may be considered be intuitive to the user. The behavioral description of the selected part may be obtained automatically using the Parser/Serializer 212 (refer to FIG. 2) and used as an input for behavioral reasoning (e.g., substitution, auto-completion, deadlock/liveness verification, etc.).

Figure 6:
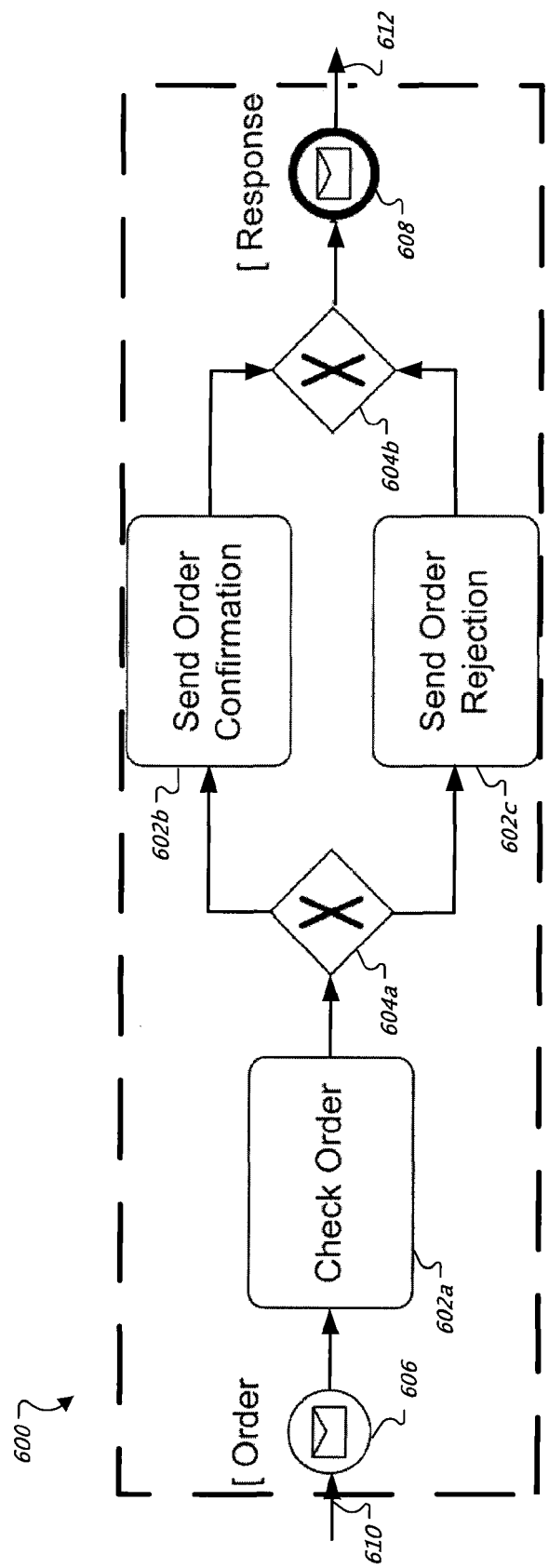
FIG. 6 shows an exemplary process model fragment that is selectable from an overall process model.

FIG. 6 shows an exemplary process model fragment 600 that is selectable from an overall process model. For example, referring to FIG. 5, the process model fragment 600 may be a user-selected portion of the overall business process model 502. As depicted, the process model fragment 600 is an order-related fragment that includes: multiple process entities (or steps) 602a-c, multiple decision/branching points 604a-b, and graphical representations of an incoming order 606 and a corresponding response message 608. The fragment 600 also includes arrows 610a and 610b that extend outside of the dashed line surrounding the fragment 600, indicating that other process steps exist. As such, the arrows 610a and 610b indicate that the fragment is part of a larger process model, such as, for example, a system that includes orders taken for products or services.

Figure 7:
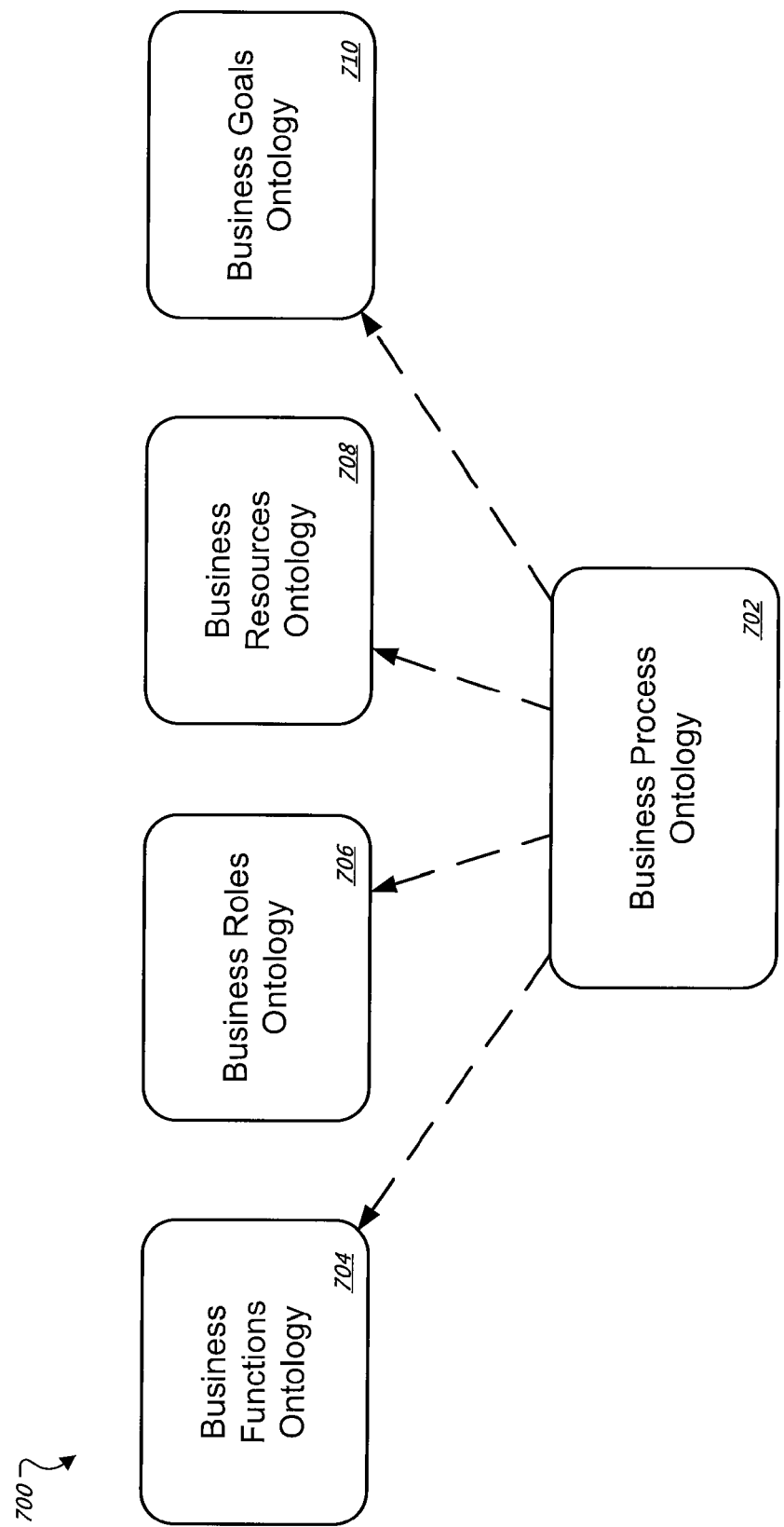
FIG. 7 shows an exemplary ontology framework with perspectives for describing a business process.

FIG. 7 shows an exemplary ontology framework 700 with perspectives for describing a business process. To describe the behavioral (dynamic) perspective of a process model, the process algebra, or the π-calculus, may be used. There are several reasons for selecting the π-calculus as theory for describing the distributed and dynamic nature of modern business process model (BPM) systems. First, the theory supports message-based interaction, an important requirement for supporting both intra- and inter-organizational processes. Second, it supports the trend of shifting from central to distributed BPM systems, and thus enables reasoning over distributed processes. Third, it supports the BPM shift towards dynamic, open environments with constantly changing number of interaction partners, such as the Internet, using the link passing mobility property.

In addition, recent research has shown that the π-calculus is able to easily express the formal semantics of all documented workflow patterns as well as represent powerful service choreographies. By using the π-calculus for representing the process behavior, it may also be possible to integrate existing tools and techniques for verification and simulation of processes in the framework. The dynamic perspective of a process model stands for process control and dataflow, and it may be modeled using the ontologized π-calculus, denoted by a business process ontology 702.

For representing the functional, organizational and informational perspective, a set of ontologies, imported by the business process ontology 702, may be used. A business functions ontology 704 provides a structural breakdown of the organization's business functions. Concepts from this ontology may classify process models by their functionality, independent of the business domain. A business roles ontology 706 includes concepts representing roles in the organization, e.g., Manager, Engineer, Clerk, Secretary, etc. A business resources ontology 708 describes the resources (e.g., documents, systems, machines, etc.) which are used to operate the activities in processes. A business goals ontology 710 models a hierarchy of organization business goals (e.g., milestones, objectives, etc.) according to which the processes in the organization are designed.

Business goals may be modeled in such a way that they conflict if they cannot be satisfied simultaneously. Moreover, goals may influence positively or negatively other goals. Note that these perspectives correspond to a static view of a process, such as the information displayed in the input dialog 400 described for FIG. 4 related to queries on the static view of a process (static queries).

Figure 8:
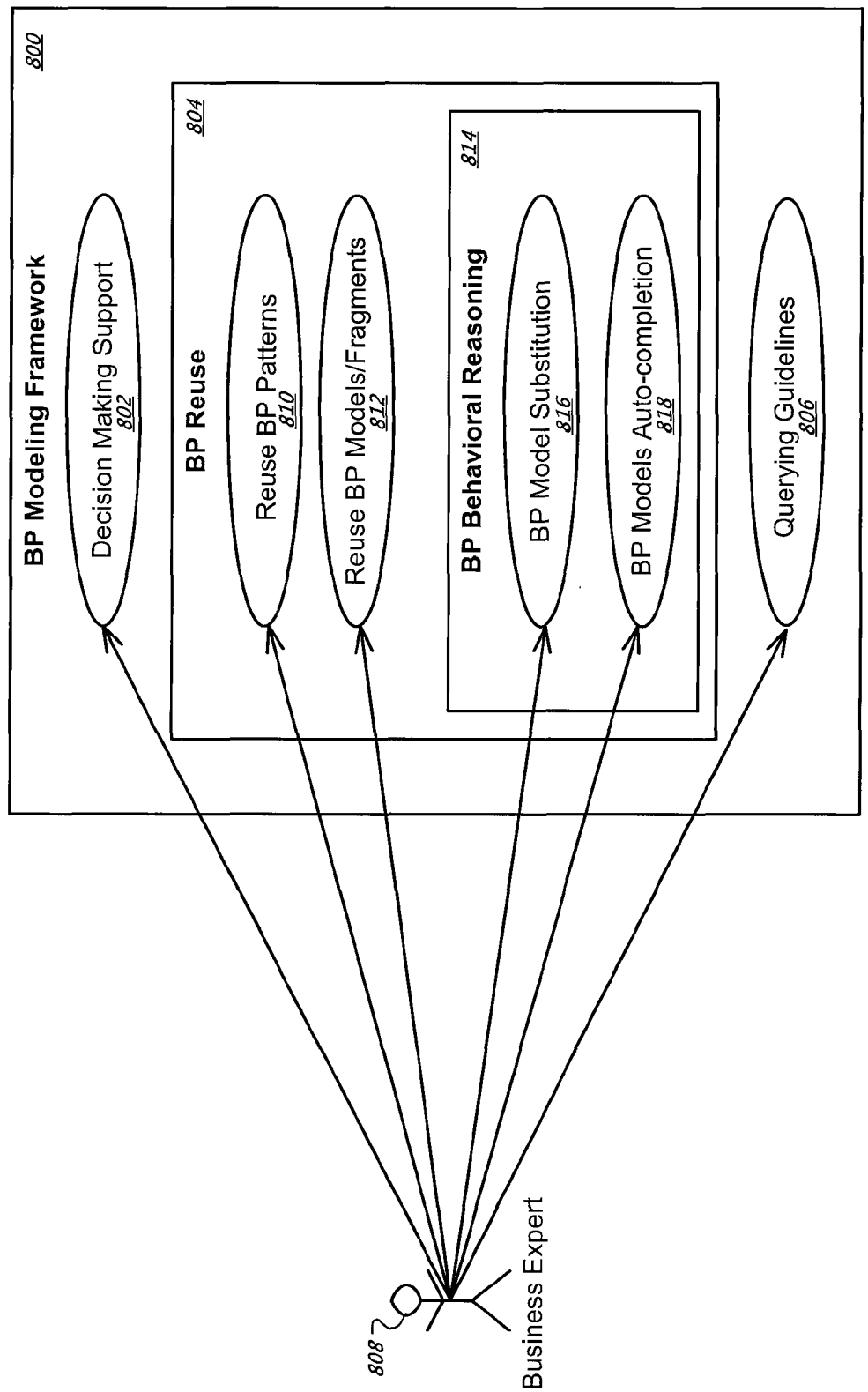
FIG. 8 is a block diagram of exemplary usage scenarios within the business process modeling framework.

FIG. 8 is a block diagram of exemplary usage scenarios within the BP modeling framework 800. Briefly, the BP modeling framework 800 includes a decision making support scenario 802, a BP reuse scenario 804, and a querying guidelines scenario 806.

Within the decision making support scenario 802, a key challenge in decision making may be having access to all relevant information which is to be assessed in a particular situation. Such information typically may be scattered in organization processes and may have to be manually collected from diverse sources for each individual case. To facilitate this task, the framework may enable a business expert 808 to quickly and expressively query the process artifact repository of an organization. Some example queries for this scenario include: "Give me all processes in the fulfillment area", "Which processes use system x?", "What resources are needed for running process y?", "List all processes with conflicting goals.", "How many transactions are carried out with a partner z on a monthly basis?", et cetera.

The BP reuse scenario 804 includes the reuse of BP process artifacts. Reuse may occur through the use of process patterns, models, fragments and modeling guidelines as process artifacts. The BP reuse scenario 804 describes how the business expert may query the process artifact repository for reuse of process patterns 810 and models/fragments 812 in process design. Since process modeling is a complex activity, reuse of existing models and model components may be advantageous in all stages of modeling. For instance, when designing a new process, the business expert 808 may first query existing business process patterns 810 (e.g., generic high-level process designs emphasizing business goals) in search of the best modeling practices in a given domain. An example query for business patterns may be: "Give me all business patterns related to Fulfillment Business Function where Business Goals involved are PROFILEOBTAINED and SERVICEACTIVATED."

The business expert 808 may also query in the same way for existing models or process fragments (e.g., self-contained, coherent building blocks of a process model with a clear business meaning). In case there are existing process models or fragments that are similar to the desired end design, the business expert 808 may use them in the design in order to achieve a higher degree of reuse, compared to the reuse of patterns. Moreover, if the user wants to substitute an existing process fragment based on redesign goals, or auto-complete an underspecified model, the user may make graphical queries based on behavioral reasoning 814. Specifically, the business expert 808 may select the desired process part for the substitution 816 or auto-completion 818 in the modeling tool. For this purpose, the framework 800 may use properties of bisimulation theory for the π-calculus.

The querying guidelines scenario 806 covers querying for business process guidelines. For example, the guidelines may include concrete policies defined according to company strategies which apply orthogonally to all processes of an organization, such as the business process steps needed to complete an order. Queries involved in this scenario may retrieve all modeling guidelines (both mandatory and conditional) which match context annotations of the model being checked. This may reduce the manual effort of creating an inventory of such guidelines for any given model. For checking which guidelines are relevant in a digital content provisioning process, an example query may be: "Give me all modeling guidelines for Digital Asset Management Business Function where clients are minors and Business Goal associated belongs to Fulfillment."

Figure 9:
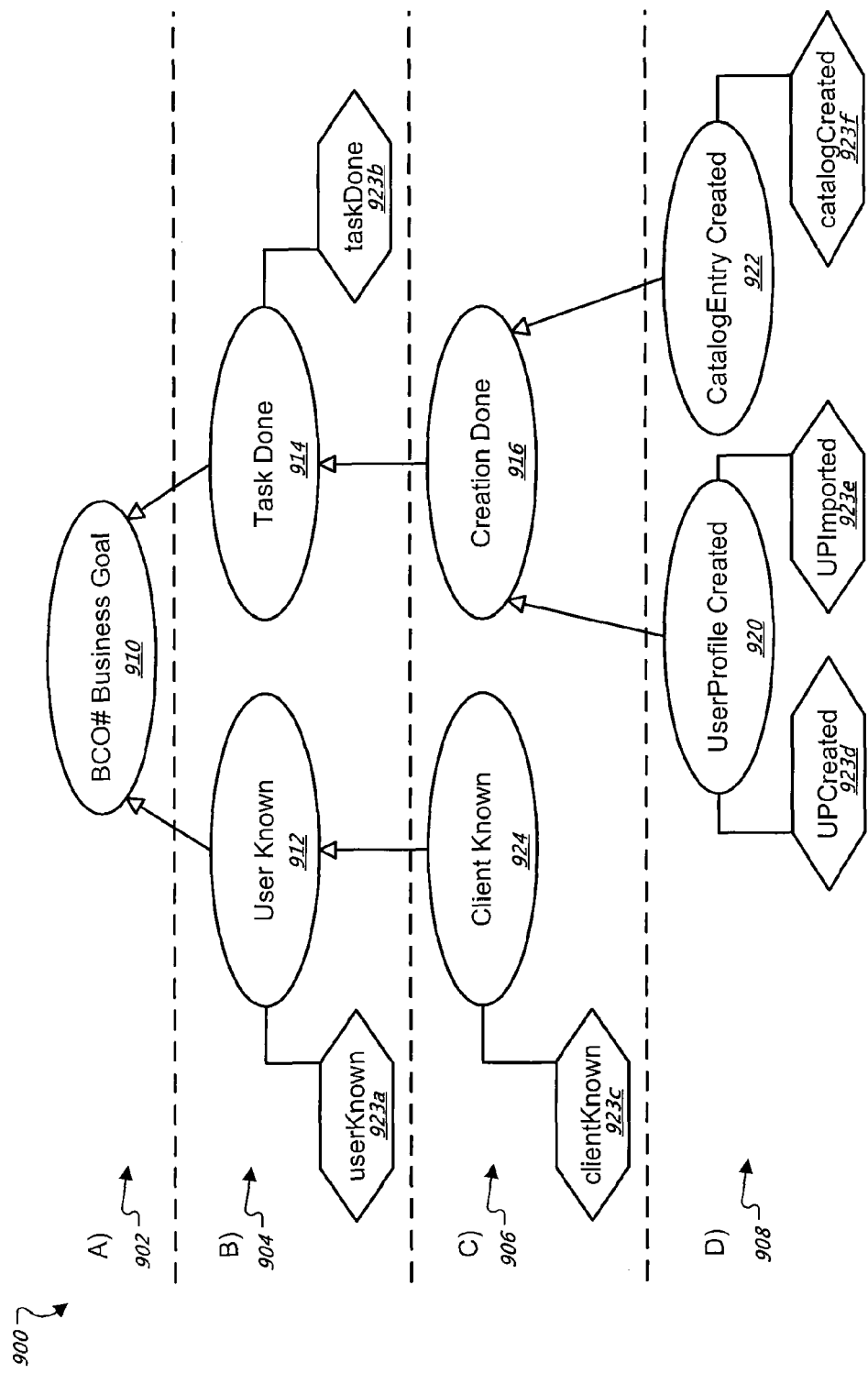
FIG. 9 is a block diagram showing an exemplary business goals hierarchy.

FIG. 9 is a block diagram showing an exemplary business goals hierarchy 900. The hierarchy 900 may be used as a refinement step to achieve flexibility in querying by adjusting, for example, the number of results responsive to a query. For example, depending on the user query, there may be too many or too few results coming from the repository. To achieve flexibility in such a situation, the user may be provided with the ability to: 1) specify further constraints in the query, choosing more refined goals, thus retrieving more precise and shorter list of results, or 2) eliminate some constraints from the query and look for more abstract goals or more undefined flow structure of the process, thus retrieving more results.

Hierarchies may represent business goals, and are depicted in FIG. 9 using hierarchical levels of increasing detail: level A 902, level B 904, level C 906 and level D 908. Level A 902 includes a "BCO# Business Goal" node 910 which is the highest hierarchical entity in FIG. 9, and as such, may serve as the root of the hierarchy (or tree). The node 910 may be thought of as an abstraction of its subordinate nodes 912 and 914. In general, nodes depicted as ovals in FIG. 9 may be thought of as ontology concepts, some of which are abstractions of concepts at the next hierarchically lower level.

For example, a "Creation Done" concept 918 at the level C 906 is an abstraction of subconcepts "UserProfile Created" 920 and "CatalogEntry Created" 922 at level D 908. As such, if the user's query returns just the "Creation Done" concept 918, and the user want more information, the user may drill down to see information for subconcepts "UserProfile Created" 920 and "CatalogEntry Created" 922. In some implementations, drilling down or choosing to see more detail may be, for example, a user setting on the query input dialog 400 (if the user is viewing static information) or double-clicking on a graphical entity, such as an element in the interface 500 (e.g., for dynamic information).

Instances 923*a-f* are represented in FIG. 9 as hexagonal shapes connected to associated ontology concepts. For example, the "userKnown" instance 923*a* is an instance corresponding to the "user Known" ontology concept 912, and the "taskDone" instance 923*b* is an instance corresponding to the "Task Done" ontology concept 914.

The refinement may be done mainly by navigation inside sub-concepts, skipping instances connected to super-concepts. Since a concept may have many sub-concepts, the interaction with the user may be necessary to choose which path to follow. In FIG. 9, an example of refinement is represented by a search for the goal "Creation Done" 918, which has at the moment no instances directly connected, however, its subconcepts "User Profile Created" 920 and "Catalog Entry Created" 922 do have, and processes associated with at least one of these instances are results of a refined query.

If there are too few results, the framework may automatically search for instances connected to the parent concepts of the requested one in order to relax the query. For example, in FIG. 9, a query for processes related to the goal "Client Known" 924 has just one instance as a result. If the framework decides to look for instances connected to "User Known" 912, two instances (i.e., concepts 912 and 922) match the query. In general, when going deeper in the tree structure of goals, one would retrieve fewer results (refinement), while when going upward in the tree structure the relaxation occurs.

A second way for relaxing a query may be to "skip" target concepts in the query, e.g., using "OR" statements or other logic. For example, the user may specify which concepts are required and which are optional using the input dialog 400 in FIG. 4. Consider an example when the user wants models achieving goals A 902, B 904 and C 906, where A and B are required to be parts of the model, and C is optional. The framework may try to find models achieving all goals using Equation (1):

$$Q=\{x|x \in M \wedge ant(x,A) \wedge ant(x,B) \wedge ant(x,C)\} \quad (1)$$

In Equation (1), Q represents the resulting set of process models, M denotes the set of all process models, and relation ant denotes that a model x is annotated using the ontology concept A.

In case no results meet the query, the framework may automatically decide to relax the query, executing Equation (2):

$$Q=\{x|x \in M \wedge ant(x,A) \wedge ant(x,B)\} \quad (2)$$

In one case, the framework submit Equation (3), preferring to answer the user queries where all three goals are achieved:

$$Q=\{x|x \in M \wedge (ant(x,A) \wedge ant(x,B) \wedge ant(x,C)) \vee (ant(x,A) \wedge ant(x,B))\} \quad (3)$$

Equation (3) may indicate a clear need for ranking: results that fulfill all goals are matching perfectly the user query, while results obtained for the relaxed query are fulfilling just a part of the user's need. In some implementations, the framework described by this disclosure may include ranking of query results.

Figure 10:
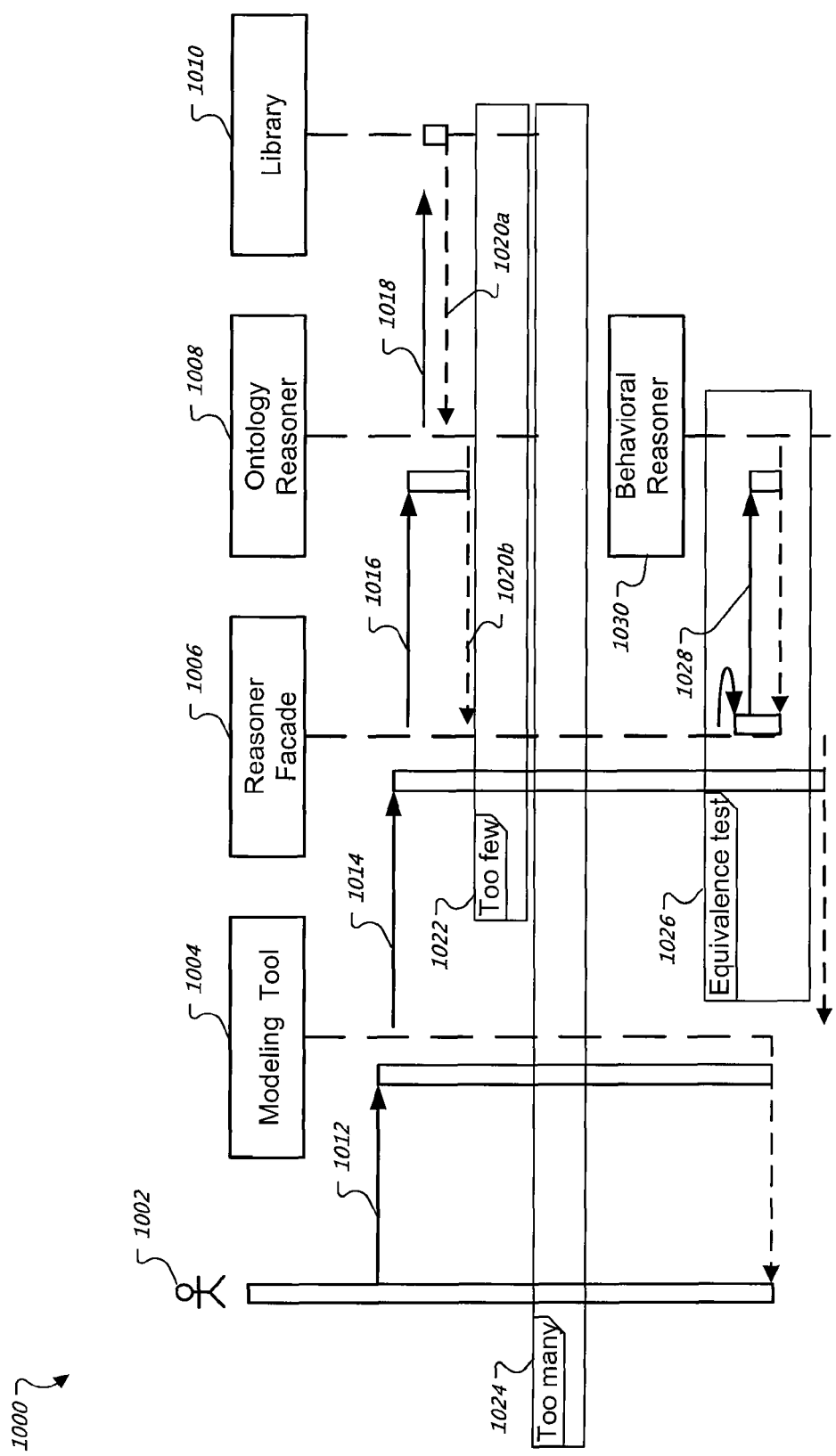
FIG. 10 is a sequence diagram showing exemplary functionalities of the querying framework.

FIG. 10 is a sequence diagram 1000 showing exemplary functionalities and steps of the querying framework. Specifically, the sequence diagram shown here resembles a Unified Modeling Language (UML) sequence diagram. Briefly, the sequence diagram 1000 shows exemplary ordered interactions between a user 1002, a modeling tool 1004, a reasoner façade 1006, an ontology reasoner 1008, and a library 1010.

As a first step, the user 1002 (e.g., a business expert) submits a query 1012 to the framework, such as by choosing concepts from a loaded ontology base for the model that the user 1002 is looking for. The query 1012 is received by the modeling tool 1004 within the framework. The modeling tool 1004 submits a corresponding query 1014, e.g., in the form of a template previously described to the reasoner façade 1006, a layer on top of the ontology reasoner 1008. The query 1014 is adapted and forwarded in the form of an adapted query 1016 to the ontology reasoner 1008, which performs querying 1018 and retrieves process models from the library 1010.

The reasoner façade 1006 waits for the answer (1020a, 1020b) of the back-end reasoner and analyzes the result. If the result set is too small (or "too few" 1022), the reasoner façade 1006 may decide (e.g., automatically) to relax the query and perform a new request. If the result set is too large (or "too many" 1024), the reasoner façade 1006 may decide to do further filtering by asking the user 1002 for more specific information. The framework may then give the user 1002 back the control of the modeling tool 1004, e.g., with a list inside a pop-up window from which the user 1002 may choose the right model to be used.

If the user wants to perform a graphical query as well, queries may represent a selection of a model part or fragment in the editor, such as the interface 500 described in reference to FIG. 5. For example, a query may be associated with an equivalence test 1026. The query may contain static and dynamic query information as described before. The remaining steps may be the same—a query for the static characteristics of a process is performed first; in a message 1028 the process pairs (query reference and tested process) are sent to a behavioral reasoner 1030, which answers whether the two processes are similar. This last call may be done for each process/fragment obtained in the first step.

Figure 11:
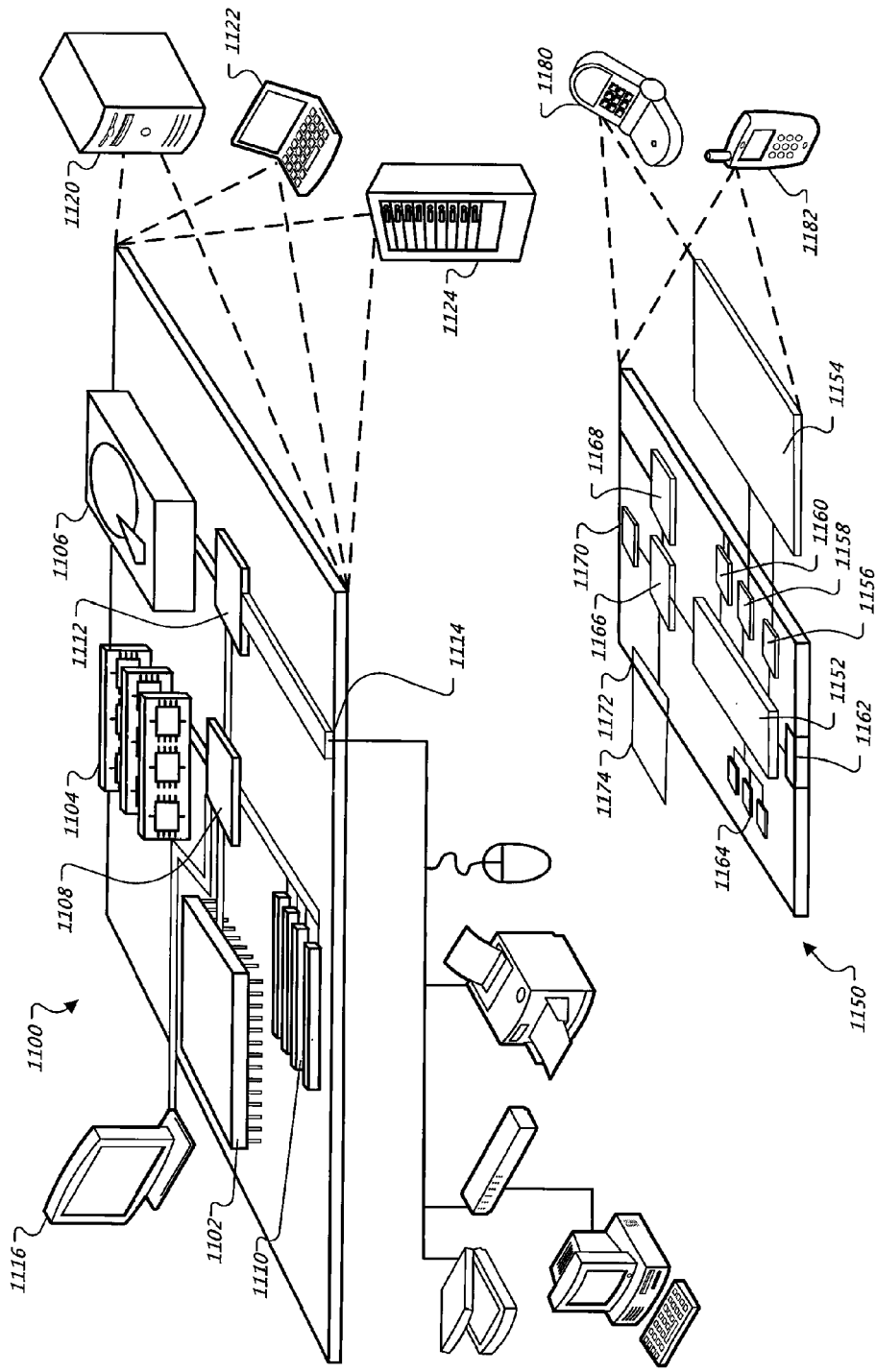
FIG. 11 is a block diagram of computing devices that may be used to implement the systems and methods described in this document.

FIG. 11 is a block diagram of computing devices 1100, 1150 that may be used to implement the systems and methods described in this document, as either a client or as a server or plurality of servers. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 may process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a computer-readable medium. In one implementation, the memory 1104 is a volatile memory unit or units. In another implementation, the memory 1104 is a non-volatile memory unit or units.

The storage device 1106 is capable of providing mass storage for the computing device 1100. In one implementation, the storage device 1106 is a computer-readable medium. In various different implementations, the storage device 1106 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1104, the storage device 1106, memory on processor 1102, or a propagated signal.

The high speed controller 1108 manages bandwidth-intensive operations for the computing device 1100, while the low speed controller 1112 manages lower bandwidth-intensive operations. Such allocation of duties is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 may process instructions for execution within the computing device 1150, including instructions stored in the memory 1164. The processor may also include separate analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD display or an OLED display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may provide, for example, for wired communication (e.g., via a docking procedure) or for wireless communication (e.g., via Bluetooth or other such technologies).

The memory 1164 stores information within the computing device 1150. In one implementation, the memory 1164 is a computer-readable medium. In one implementation, the memory 1164 is a volatile memory unit or units. In another implementation, the memory 1164 is a non-volatile memory unit or units. Expansion memory 1174 may also be provided and connected to device 1150 through expansion interface 1172, which may include, for example, a SIMM card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, memory on processor 1152, or a propagated signal.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS receiver module 1170 may provide additional wireless data to device 1150, which may be used as appropriate by applications running on device 1150.

Device 1150 may also communication audibly using audio codec 1160, which may receive spoken information from a user and convert it to usable digital information. Audio codex 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smartphone 1182, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
   receiving a user input at a computing device, the user input defining behavioral and static aspects of a target process artifact and comprising business process information for use in a specific business process model within an organization, the behavioral aspect comprising inputs for one or more behavioral reasoning processes comprising substitution, auto-completion, and deadlock/liveliness verification;
   automatically defining a query specification comprising:
      an axiom component expressing the static aspect using a logical expression, and
      a process definition component expressing the behavioral aspect using ontologized $\pi$-calculus;
   querying a process artifact library using the query specification, the process artifact library provided as a computer-readable repository that stores one or more of process patterns, models, fragments, and guidelines, the querying comprising:
      querying the process artifact library relating to the static aspect of the target process artifact to obtain a subset of the process artifact library;
      after querying, performing $\pi$-calculus reasoning, related to the behavioral aspect of the target process, on the subset of the process artifact library; and
   outputting a candidate process artifact matching the behavioral and static aspects, based on querying the process artifact library.

2. The method of claim 1, wherein the behavioral aspect defines constraints on desired control and data flow for the target process artifact.

3. The method of claim 1, wherein the static aspect defines a business function, or a business role, resource, and goal objective for the target process artifact.

4. The method of claim 1, wherein outputting the candidate process artifact further comprises substituting the candidate process artifact for, or appending the candidate process artifact to, an existing process artifact in a process.

5. The method of claim 1, wherein receiving the user input defining the static aspect of the target process artifact further comprises:
   displaying a user interface comprising:
      a business annotation selection region displaying desired business annotations, and
      an ontology navigator region displaying available ontology concepts;
   receiving a user selection based on dragging an available ontology concept from the ontology navigator region to the business annotation region, thereby rendering the ontology concept as a selected desired business annotation; and
   outputting, as the user input, the selected desired business annotation.

6. The method of claim 5, further comprising:
   receiving a user selection of a tab corresponding to a process model functional classification; and
   outputting, as the user input, the process model functional classification corresponding to the selected tab, the process model functional classification being one of a functional classification, a role classification, a resource classification, or a goal classification.

7. The method of claim 1, wherein outputting a candidate process artifact further comprises outputting a process model, pattern, fragment, or guideline, determined based upon a user preference.

8. The method of claim 1, wherein receiving the user input defining the behavioral aspect of the target process artifact further comprises:
   displaying a user interface comprising a business process display region displaying a business process;
   receiving a user selection highlighting a portion of the business process; and
   outputting, as the user input, an automatically generated behavioral description of the highlighted portion, described using ontologized $\pi$-calculus.

9. The method of claim 8, wherein the behavioral description excludes any portion of the business process not highlighted via the user selection.

10. The method of claim 1, wherein the axiom component expresses the static aspect using Web Service Modeling Language (WSML) Logical Expression (LE).

11. The method of claim 1, further comprising matching the candidate process artifact with the behavioral aspect using congruence and bisimulation.

12. The method of claim 1, wherein the query specification further comprises a type indicator indicating whether the candidate process artifact is to be appended to or substituted for an existing process artifact.

13. The method of claim 1, wherein the query specification further comprises a namespace.

14. The method of claim 1, wherein querying the process artifact library using the query specification further comprises:
   querying the process artifact library using the axiom component; and
   querying, after querying the process artifact library using the axiom component, the process artifact library using the process definition component.

15. The method of claim 1, further comprising:
   automatically refining the query to add or eliminate constraints; and
   re-querying the process artifact library using a refined query.

16. The method of claim 1, further comprising reusing the candidate process artifact in a new business process.

17. The method of claim 1, further comprising:
   determining a business guideline associated with the candidate process artifact; and
   outputting the business guideline.

18. A device comprising:
   an interface computing device configured to:
      receive a user input defining behavioral and static aspects of a target process artifact and comprising business process information for use in a specific business process model within an organization, the behavioral aspects comprising inputs for one or more behavioral reasoning processes comprising substitution, auto-completion, and deadlock/liveliness verification, and
      output a candidate process artifact matching the behavioral and static aspects, based on querying a process artifact library, the process artifact library provided as a computer-readable repository that stores one or more of process patterns, models, fragments, and guidelines; and
   a modeling tool module configured to:
      automatically define a query specification comprising:

an axiom component expressing the static aspect using a logical expression, and a process definition component expressing the behavioral aspect using ontologized π-calculus, and query the process artifact library using the query specification, comprising querying the process artifact library relating to the static aspect of the target process artifact to obtain a subset of the process artifact library; and after querying, performing π-calculus reasoning, related to the behavioral aspect of the target process, on the subset of the process artifact library.

19. The device of claim 18, wherein the modeling tool module further comprises:

a business modeling tool configured to provide an environment for modeling business processes;

an ontology reasoner configured to perform ontological reasoning for querying the process artifact library;

a behavioral reasoner configured to perform π-calculus reasoning; and an ontology application programming interface (API) configured to create and manipulate an ontology object model for the business modeling tool, wherein the process artifact library is configured to persistently store process patterns, models, fragments, and guidelines.

20. A computer program product, tangibly embodied in a machine-readable medium, the computer program product comprising instructions that, when read by a machine, operate to cause data processing apparatus to:

receive a user input defining behavioral and static aspects of a target process artifact and comprising business process information for use in a specific business process model within an organization, the behavioral aspects comprising inputs for one or more behavioral reasoning processes comprising substitution, auto-completion, and deadlock/liveliness verification;

automatically define a query specification comprising:

an axiom component expressing the static aspect using a logical expression, and a process definition component expressing the behavioral aspect using ontologized π-calculus;

query a process artifact library using the query specification, the process artifact library provided as a computer-readable repository that stores one or more of process patterns, models, fragments, and guidelines, the querying comprising:

querying the process artifact library relating to the static aspect of the target process artifact to obtain a subset of the process artifact library;

after querying, performing π-calculus reasoning, related to the behavioral aspect of the target process, on the subset of the process artifact library; and output a candidate process artifact matching the behavioral and static aspects, based on querying the process artifact library.

\* \* \* \* \*